United States Patent
Miller

(10) Patent No.: US 7,769,844 B2
(45) Date of Patent: Aug. 3, 2010

(54) PEER PROTOCOL STATUS QUERY IN CLUSTERED COMPUTER SYSTEM

(75) Inventor: Robert Miller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2235 days.

(21) Appl. No.: 09/732,189

(22) Filed: Dec. 7, 2000

(65) Prior Publication Data

US 2002/0073153 A1   Jun. 13, 2002

(51) Int. Cl.
*G06F 15/173* (2006.01)
*G06F 15/16* (2006.01)

(52) U.S. Cl. .............. 709/224; 709/230; 709/248

(58) Field of Classification Search .......... 709/223, 709/224, 228, 230, 234, 237, 248
See application file for complete search history.

(56) References Cited

U.S. PATENT DOCUMENTS

| | | | |
|---|---|---|---|
| 4,709,365 A | 11/1987 | Beale et al. | |
| 5,146,590 A | 9/1992 | Lorie et al. | |
| 5,179,699 A | 1/1993 | Iyer et al. | |
| 5,502,818 A | 3/1996 | Lamberg | |
| 5,528,605 A | 6/1996 | Ywoskus et al. | |
| 5,563,878 A * | 10/1996 | Blakeley et al. | 326/81 |
| 5,640,554 A | 6/1997 | Take | |
| 5,704,032 A | 12/1997 | Badovinatz et al. | |
| 5,729,687 A | 3/1998 | Rothrock et al. | |
| 5,787,249 A | 7/1998 | Badovinatz et al. | |
| 5,805,786 A | 9/1998 | Badovinatz et al. | |
| 5,883,939 A | 3/1999 | Friedman et al. | |
| 5,926,619 A | 7/1999 | Badovinatz et al. | |
| 5,973,724 A | 10/1999 | Riddle | |
| 6,006,259 A | 12/1999 | Adelman et al. | |
| 6,065,062 A | 5/2000 | Periasamy et al. | |
| 6,078,957 A | 6/2000 | Adelman et al. | |
| 6,108,699 A | 8/2000 | Moiin | |
| 6,115,749 A | 9/2000 | Golestani et al. | |
| 6,138,251 A * | 10/2000 | Murphy et al. | 714/41 |
| 6,185,666 B1 | 2/2001 | Murray et al. | |
| 6,192,411 B1 * | 2/2001 | Chan et al. | 709/232 |
| 6,216,150 B1 | 4/2001 | Badovinatz et al. | |

(Continued)

FOREIGN PATENT DOCUMENTS

JP   05-204811 A   8/1993

(Continued)

OTHER PUBLICATIONS

U.S. Appl. No. 09/697,398, entitled "Group Data Sharing During Membership Change in Clustered Computer System," filed on Oct. 27, 2000 by Miller et al.

(Continued)

*Primary Examiner*—Hussein Elchanti
(74) *Attorney, Agent, or Firm*—Wood, Herron & Evans, LLP

(57) ABSTRACT

An apparatus, program product and method locally track protocol progress information within each member of a group in a clustered computer system that is capable of identifying at least one problematic member of the group. By locally tracking such information, any member of the group may be directed to provide such information on demand in response to a query directed to such member.

22 Claims, 3 Drawing Sheets

U.S. PATENT DOCUMENTS

| | | |
|---|---|---|
| 6,292,905 B1 | 9/2001 | Wallach et al. |
| 6,298,041 B1 | 10/2001 | Packer |
| 6,317,867 B1 | 11/2001 | Elnozahy |
| 6,338,092 B1 | 1/2002 | Chao et al. |
| 6,343,320 B1 | 1/2002 | Faichild et al. |
| 6,363,495 B1 | 3/2002 | MacKenzie et al. |
| 6,367,029 B1 | 4/2002 | Mayhead et al. |
| 6,381,215 B1 * | 4/2002 | Hamilton et al. ............ 370/236 |
| 6,392,993 B1 * | 5/2002 | Hamilton et al. ............ 370/230 |
| 6,408,310 B1 | 6/2002 | Hart |
| 6,425,014 B1 | 7/2002 | Aiken, Jr. et al. |
| 6,427,148 B1 | 7/2002 | Cossock |
| 6,446,219 B2 | 9/2002 | Slaughter et al. |
| 6,449,641 B1 | 9/2002 | Moiin et al. |
| 6,449,734 B1 | 9/2002 | Shrivastava et al. |
| 6,453,426 B1 | 9/2002 | Gamache et al. |
| 6,460,039 B1 | 10/2002 | Pinter et al. |
| 6,496,481 B1 | 12/2002 | Wu et al. |
| 6,507,863 B2 | 1/2003 | Novaes |
| 6,529,958 B1 | 3/2003 | Oba et al. |
| 6,545,981 B1 * | 4/2003 | Garcia et al. ............... 370/242 |
| 6,564,372 B1 | 5/2003 | Babaian et al. |
| 6,574,668 B1 * | 6/2003 | Gubbi et al. ............... 709/237 |
| 6,578,032 B1 | 6/2003 | Chandrasekar et al. |
| 6,611,923 B1 | 8/2003 | Mutalik et al. |
| 6,625,118 B1 | 9/2003 | Hadi Salim et al. |
| 6,625,639 B1 | 9/2003 | Miller et al. |
| 6,718,361 B1 | 4/2004 | Basani et al. |
| 6,757,698 B2 | 6/2004 | McBride et al. |
| 6,823,512 B1 | 11/2004 | Miller et al. |
| 6,839,752 B1 | 1/2005 | Miller et al. |
| 6,847,984 B1 | 1/2005 | Midgley et al. |
| 2002/0161889 A1 | 10/2002 | Gamache et al. |
| 2002/0165977 A1 | 11/2002 | Novaes |
| 2003/0041138 A1 * | 2/2003 | Kampe et al. ............... 709/223 |
| 2004/0153711 A1 | 8/2004 | Brunelle et al. |

FOREIGN PATENT DOCUMENTS

| | | | |
|---|---|---|---|
| JP | 07-311753 A | 11/1995 | |
| JP | 2000-156706 A | 6/2000 | |
| JP | 2000-196677 A | 7/2000 | |

OTHER PUBLICATIONS

U.S. Appl. No. 09/638,328, entitled "Merge Protocol for Clustered Computer System," filed on Aug. 14, 2000 by Miller et al.

Arindam Banerji et al., "High-Performance Distributed Shared Memory Substrate for Workstation Clusters," in Proc. of the Second IEEE Int'l Symposium on High Performance Distributed Computing, Jan. 1993.

Jing-Chiou Liou et al., "A Comparison of General Approaches to Multiprocessor Scheduling," Parallel Processing Symposium, 1997, Proceedings, 11th International, Apr. 1-5, 1997, pp. 152-156.

Leszek Lilien, "Quasi-Partitioning: A New Paradigm for Transaction Execution in Partitioned Distributed Database Systems," Data Engineering, 1989, Proceedings, Fifth International Conference on Feb. 6-10, 1989, pp. 546-553.

Pei Yunzhang et al., "Totally Ordered Reliable Multicast for Whiteboard Application," Department of Computer Science and Technology, Tsinghua University, Beijing, 1999, pp. 1-7.

Wanlei Zhou et al., "Parallel Recovery in a Replicated Object Environment," School of Computing and Mathematics, Deakin University, pp. 1-6.

D. A. Agarwal et al., "A Reliable Ordered Delivery Protocol for Interconnected Local-Area Networks," in Proc. of the International Conference on Network Protocols, Tokyo, Japan, Nov. 1995, pp. 365-374.

Paul et al., "Reliable Multicast Transport (RMTP)," Apr. 1997, IEEE Journal on Selected Areas in Communications, vol. 15, No. 3, pp. 407-421.

"Distributed Parallel Build System for Hierarchically Organized Large Scale Software Systems", IBM Technical Disclosure Bulletin, US, vol. 39, No. 6, (Jun. 1, 1996), pp. 63-68.

Timothy Roy Block, IBM Patent Application filed Nov. 22, 2000, U.S. Appl. No. 09/718,924, "Apparatus and Method for Communicating Between Computer Systems Using a Sliding Send Window for Ordered Messages in a Clustered Computing Environment".

* cited by examiner

PEER PROTOCOL STATUS QUERY IN CLUSTERED COMPUTER SYSTEM

FIELD OF THE INVENTION

The invention is generally directed to clustered computer systems, and in particular, to protocol status monitoring in such systems.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group.

In many clustered systems, joint operations are implemented using a "peer"-type protocol, where all members receive a message and each member is required to locally determine how to process the protocol and return an acknowledgment indicating whether the message was successfully processed by that member.

Typically, with a peer protocol, members are prohibited from proceeding on with other work until acknowledgments from all members have been received. Moreover, each member is required to send an acknowledgment (ACK) message to every other member when its local processing of a protocol is complete.

Since each member is required to wait for ACK messages from every other member before completing a protocol, whenever one member doesn't promptly send out ACK messages (e.g., due to being locked up, or "hung"), all members participating in the same protocol are effectively stalled while waiting for the ACK messages from the non-responding member. Also, even if a particular member is not completely hung, but is simply slow in responding (e.g., due to delays in obtaining a local resource for the member, a lack of adequate CPU time due to the presence of other, higher priority jobs on the member's node, comparatively lower hardware performance on the member's node, network delays, etc.), all members will likewise appear to be slow as well.

Given that a problem in a particular member that degrades the responsiveness of that member often has similar effects on other group members, diagnosing and correcting a problem in a clustering environment are often hindered by the inherent difficulty associated with identifying which member in a problematic group is the root cause of the problem.

To identify problematic members, many conventional clustering environments traditionally require that members be arbitrarily chosen and analyzed to determine their respective operational status. For example, many conventional environments support the ability to dump a local call stack for a particular member through a local debugging operation performed on that member.

However, diagnosis through the arbitrary selection of members is rarely an efficient way of locating a problematic member, since on average for a group of N members, N/2 of the members would need to be analyzed to locate the problematic member. Moreover, in the worst case scenario, all N members would need to be analyzed. The difficulty in identifying a problematic member is further exacerbated in situations where there are a relatively large number of members, as well as when those members are geographically dispersed (e.g., connected over a wide area network (WAN)).

Therefore, a significant need exists in the art for an improved manner of diagnosing faults in a clustered computer system, particularly to detect problematic members that are inhibiting the progress of peer protocols executing on multiple members in the system.

SUMMARY OF THE INVENTION

The invention addresses these and other problems associated with the prior art in providing an apparatus, program product and method that locally track protocol progress information within each member of a group that is capable of identifying at least one problematic member of the group. By locally tracking such information, any member of the group may be directed to provide such information on demand in response to a query directed to such member. As a consequence, if there are N members of a group, and one is problematic, the probability of successfully obtaining the protocol progress information via a query directed to an arbitrary group member is at worst (N−1)/N (assuming a problematic member is incapable of responding to a query). Typically, in such a situation, at most two requests would be needed to obtain the necessary information.

Therefore, consistent with the invention, the status of a peer protocol initiated on a plurality of members of a group in a clustered computer system is determined by locally tracking protocol progress information within each member of the group, and responding to a query directed to a selected member of the group by providing the protocol progress information locally tracked by the selected member.

Consistent with another aspect of the invention, a member of a group in a clustered computer system may be monitored for receipt of a query message while a current protocol for the member is waiting on a resource. Then, despite the fact that the member is waiting on the resource, protocol status information may be output in response to receipt of the query message.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter utilize localized protocol status monitoring functionality within a messaging service to facilitate diagnosis and repair of stuck or slow group members participating in peer protocols.

Figure 1:
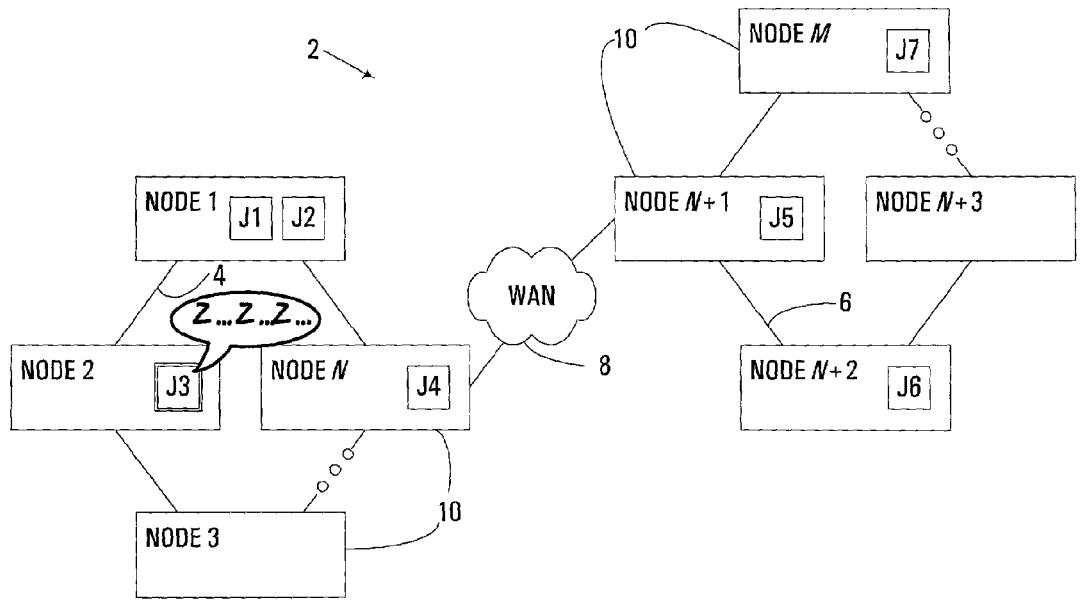
FIG. 1 is a block diagram of a clustered computer system consistent with the invention.

Turning to the Drawings, wherein like numbers denote like parts throughout the several views, FIG. 1 illustrates an exemplary clustered computer system 2 including a plurality of nodes 10 interconnected with one another in a distributed manner, e.g., via local area networks (LAN's) 4, 6 and a wide area network (WAN) 8. Any number of network topologies commonly utilized in clustered computer systems may be used consistent with the invention. Moreover, individual nodes 10 may be physically located in close proximity with other nodes, or may be geographically separated from other nodes, as is well known in the art.

In the context of a clustered computer system, at least some computer tasks are performed cooperatively by multiple nodes executing cooperative computer processes (referred to herein as "jobs") that are capable of communicating with one another. Such cooperative jobs are logically organized into a "group", with each cooperative job being designated as a "member" of the group. Group members, however, need not necessarily operate on a common task—typically all that is required for members of a group is that such members be capable of communicating with one another during execution.

FIG. 1, for example, illustrates an exemplary cluster of nodes 10, also denoted herein for purposes of example by the sequential identifiers 1, 2, 3 . . . N, N+1, N+2, N+3 . . . M (where M>N). Resident within various nodes are a plurality of jobs J1-J7 forming the members of an exemplary group in the clustered computer system. As shown in the figure, nodes in a clustered computer system are not required to participate in all groups (e.g., node 3). Moreover, multiple members from a given group may be resident in the same node (e.g., jobs J1 and J2 in node 1).

In the illustrated embodiments, members communicate with one another through the use of ordered messages. A portion of such messages are referred to herein as "requests," which are used to initiate "protocols" in response to activation by a user (e.g., an application or other computer process executing on one or more nodes in the clustered computer system). A protocol of this type (referred to hereinafter as a "peer" protocol, to distinguish from local protocols used in the illustrated implementation to perform purely local cluster-related actions) is a unit of work that all members of a group are required to handle. Typically, in response to a peer protocol request, each member is also required to return an acknowledgment message to every other member to indicate success or failure of a particular protocol by that member. Moreover, typically no member is permitted to continue until acknowledgment messages have been received from all group members.

One phenomenon that may occur during execution of a clustered computer system is a fault in a group member that delays or prevents that member from sending one or more ACK messages required to complete a peer protocol. Given the requirements of a peer protocol, any such fault results in all group members essentially stalling while waiting for the ACK messages from the member within which the fault occurs. Consequently, if a group member in the exemplary group of FIG. 1 (e.g., job J3) is stuck or slow, all other members J1-J2 and J4-J7 will typically be stalled whenever a peer protocol is being performed where an ACK message from job J3 still needs to be received.

Figure 2:
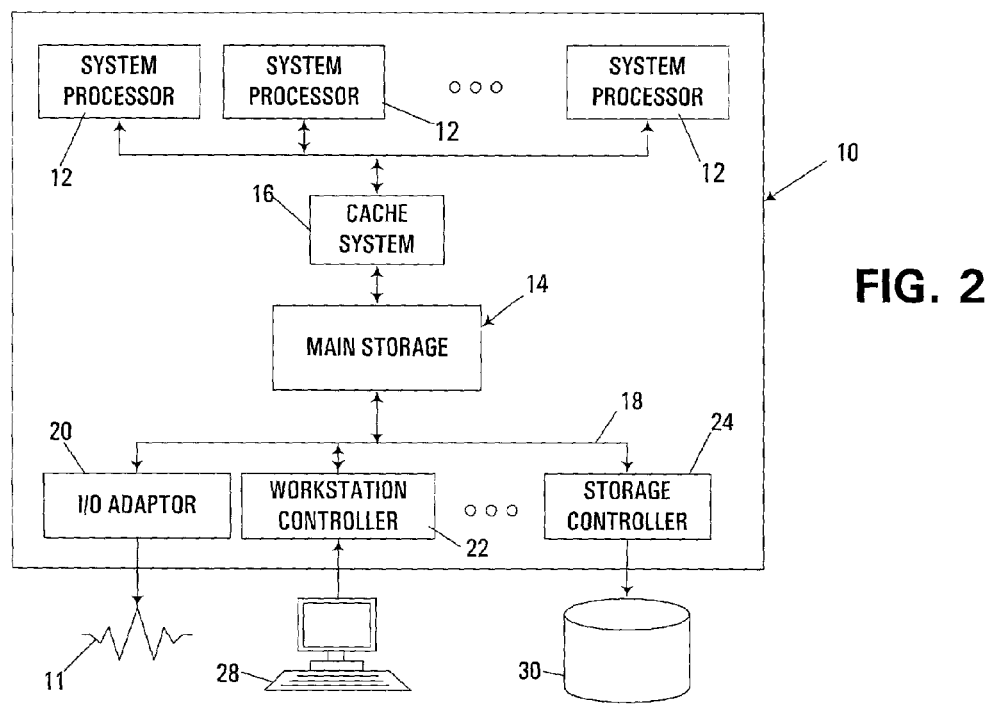
FIG. 2 is a block diagram of a node in the clustered computer system of FIG. 1.

Now turning to FIG. 2, an exemplary hardware configuration for one of the nodes 10 in clustered computer system 2 is shown. Node 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 10 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a cluster network 11), one or more workstations 28, and/or one or more storage devices such as a direct access storage device (DASD) 30. Any number of alternate computer architectures may be used in the alternative.

Figure 3:
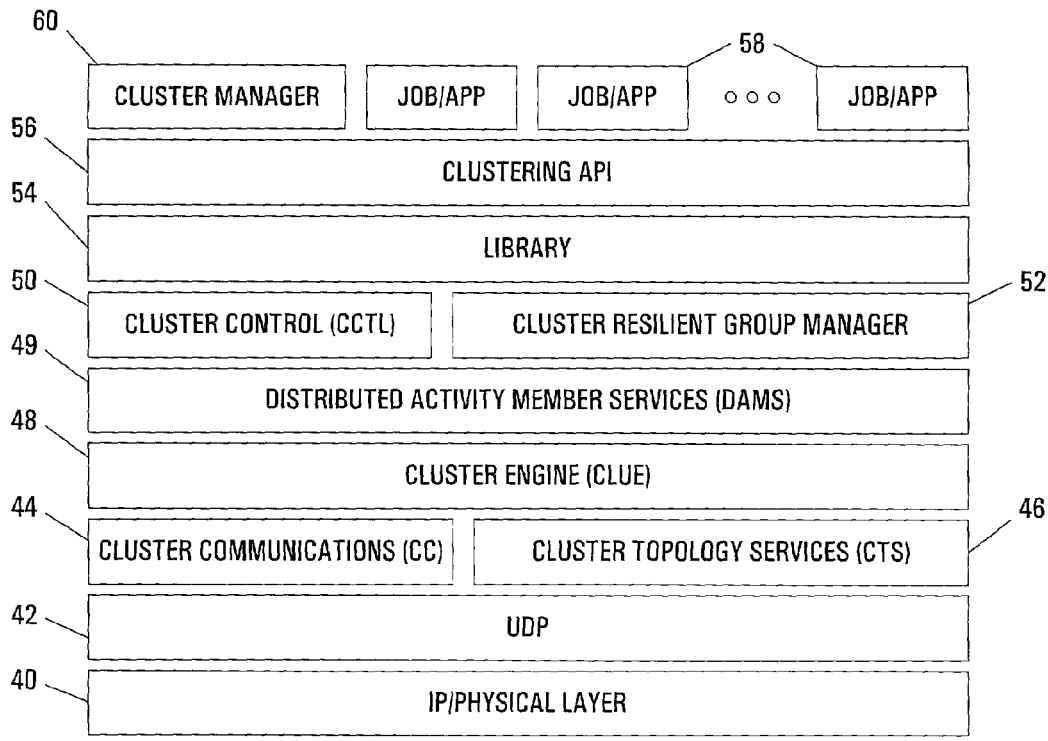
FIG. 3 is a software layer diagram of the principal clustering software components utilized in the node of FIG. 2.

As shown in FIG. 3, the principal software components executed within an exemplary implementation of node 10 for implementing clustering functionality include an IP/physical layer component 40, a UDP component 42, a cluster communications (CC) component 44, a cluster topology services (CTS) component 46, a cluster engine (CLUE) component 48, a distributed activity member services (DAMS) component 49, a cluster control (CCTL) component 50, a cluster resilient group manager component 52, a library component 54, a clustering API component 56, and a plurality of jobs/applications 58, including a cluster manager application 60.

Generally, IP/physical layer component 40 provides an industry standard communications stack and physical interface with a network. UDP component 42 provides a packet transmission protocol, and CC component 44 provides support for reliable multicast clustering communication services, e.g., as discussed in greater detail in U.S. patent application Ser. No. 09/280,469, filed by Block et al. on Mar. 30, 1999, the disclosure of which is incorporated by reference herein.

CTS component 46 monitors the network topology of a clustered computer system, and stores information such as the layout of nodes, the specifications of network interconnects between nodes, the geographical locations of nodes, and node status information. CLUE component 48 provides a distributed ordered group messaging service.

DAMS component 49 functions as a middleware messaging service component within which support for peer protocol status queries is principally provided. In addition, DAMS component 49 provides other functionality such as registering and unregistering jobs with the CLUE component, monitoring and managing a message queue in the CLUE component, and routing messages to higher layer threads in CCTL component 50 and Cluster Resilient Group Manager 52.

CCTL component 50 manages the configuration and activation of clustering on a node, typically supporting various cluster initialization and node management operations suitable for managing a clustered environment. Cluster resilient group manager component 52 synchronously maintains copies of group membership status information across the cluster, while library component 54 provides other support services for a cluster. Clustering API component 56 provides the external interface to the underlying clustering functionality via jobs/applications 58. Clustering administration, including the initiation of protocol status queries on a particular node, may be invoked via a cluster manager application 60.

The discussion hereinafter will focus on the specific routines utilized to implement the above-described peer protocol status query functionality. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 4:
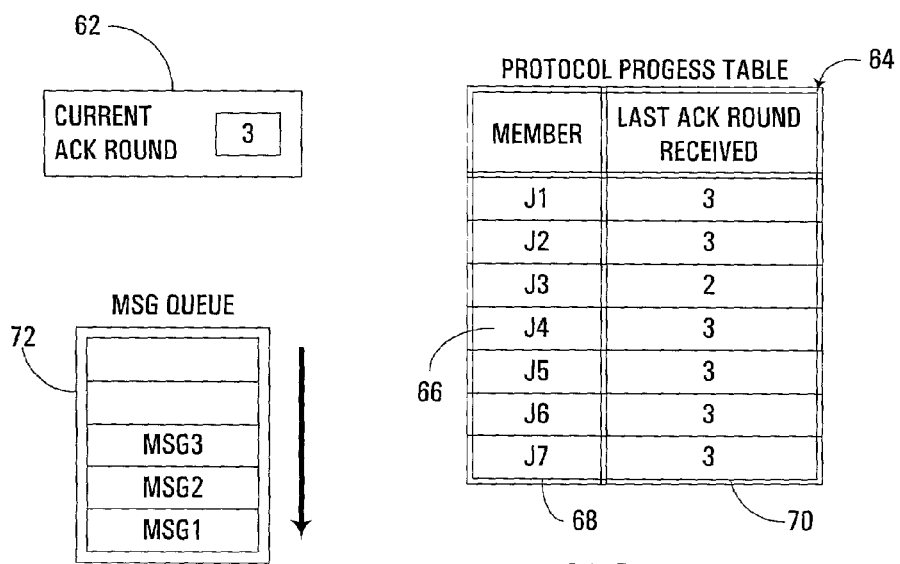
FIG. 4 is a block diagram of a number of data structures utilized in localized tracking of protocol progress information in the clustered computer system of FIG. 1.

FIG. 4 illustrates a number of data structures utilized in implementing the above-described peer protocol status query functionality. The data structures illustrated in FIG. 4 are incorporated into each member of the group, such that the information tracked within the local data structure of each member can be retrieved via a local operation on any member.

In particular, a current ACK round parameter 62 stores a current acknowledgment round being processed by a local member, based on the current protocol being executed by such member. In the illustrated embodiment, acknowledgment rounds are numbered, starting with an initial number such as 1. Each ACK round increases the number by 1, and since all members participate in each ACK round, all members should have the same ACK round number for any given ACK round. Other manners of identifying ACK rounds may be used in the alternative.

In addition, a protocol progress table 64 is locally maintained within each member, including a plurality of entries 66, each identifying a member of the group in field 68, and a last acknowledgment round received parameter 70 that indicates the round of the last ACK message received from that member. Thus, an entry is provided for each member of the group, and for each such member, the last acknowledgment round from which an ACK message was received from such member is maintained in the entry.

A status query is used to return the information received in parameter 62 and table 64. Since the returned information indicates the last ACK round for all members, and since the protocols being tracked are peer protocols, the returned information can be used to obtain the last ACK status from all other members without doing a distributed request. From such information, it is rudimentary to determine who the stuck or slow member is, typically by looking at the highest ACK round stored for all members. Any member that is not at the most recent round is "behind", and is typically the cause of a stalled protocol.

Yet another data structure maintained in each member is a message queue 72 through which all messages, local or distributed, are passed. In the illustrated embodiment, protocols are message-based, and as such, any request for a protocol, as well as any acknowledgment message thereto, is processed locally by each member through the enqueuing and dequeuing of messages on the message queue. In addition, in the illustrated embodiment, anytime that a member is required to wait for a resource, even if the resource is local and outside of a peer protocol, the resource request is also processed as a message placed on the message queue.

Through the use of a message queue within each member, anytime that member is waiting on a resource, be it a local resource (e.g., as with a request to create a new job or a request for a lock or semaphore), or an external resource (e.g., as with a communication message request or a peer protocol, the latter of which requires the receipt of acknowledgment messages from all other participating members), each member is held in a mechanism of the messaging service that permits queries to be made while the member is being held waiting for its requested resource.

In the illustrated embodiment, the message queue is associated with a cluster infrastructure method known as MessageWait( ) that is called whenever a member is waiting on a resource. While waiting in the MessageWait( ) method, the member is still capable of detecting and handling messages sent to the member.

Assuming that any protocol is well-behaved, by placing any member that waits on a resource in the MessageWait( ) method, a query can be sent to any member (including the stuck/slow one) and the same progress information may be returned. Thus, in many instances, even a slow or stuck member may still respond to an inquiry. However, even if the stuck or slow member is locked up and not waiting in the MessageWait( ) method, at most a second query to another member would be required to obtain the needed status information.

To maintain the protocol progress information, tracking functionality is typically implemented within the protocol processing code within each member. For example, it may be desirable to update protocol progress information in response to receipt of peer protocol ACK messages, or in other suitable manners.

Figure 5:
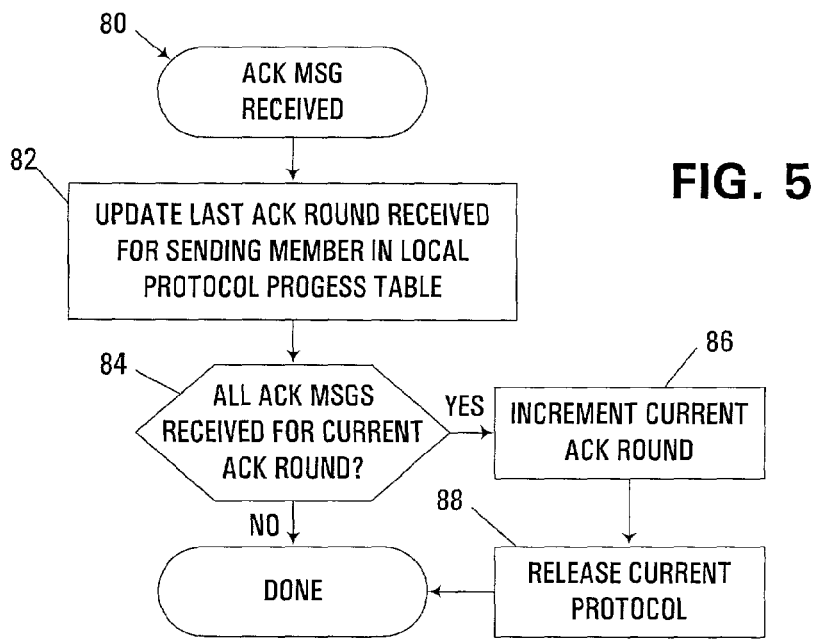
FIG. 5 is a flowchart illustrating the program flow of an acknowledgment (ACK) message received routine executed by a node to locally track protocol progress information for the clustered computer system of FIG. 1.

FIG. 5, for example, illustrates an exemplary ACK message received routine 80, which operates as an ACK message handler. Routine 80 begins in block 82 by updating the last ACK round received parameter for the sending member of the received ACK message in the local protocol progress table for the receiving member. The parameter is set according to the number of the ACK round associated with the received ACK message.

Next, block 84 determines whether all ACK messages have been received for the current ACK round—i.e., whether the current ACK round has been completed. If not, routine 80 is complete, as no further processing of the ACK message is required. If, on the other hand, all ACK messages have been received, control passes to block 86 to increment the current ACK round parameter for the local member. Control then passes to block 88 to release the current protocol that is waiting for completion of the current ACK round. Routine 80 is then complete.

Various manners of holding and releasing a protocol may be used consistent with the invention. In the illustrated embodiment, for example, it may be desirable to utilize a semaphore to lock any member that is performing a peer protocol whenever it is desirable to wait for completion of an ACK round. As discussed above, one manner of doing so is to require a protocol to wait for a resource such as completion of an ACK round on the message queue. Thus, whenever the current ACK round is complete, the protocol may be released in block 88 by releasing the semaphore, thereby permitting continued execution of the protocol by the member.

Figure 6:
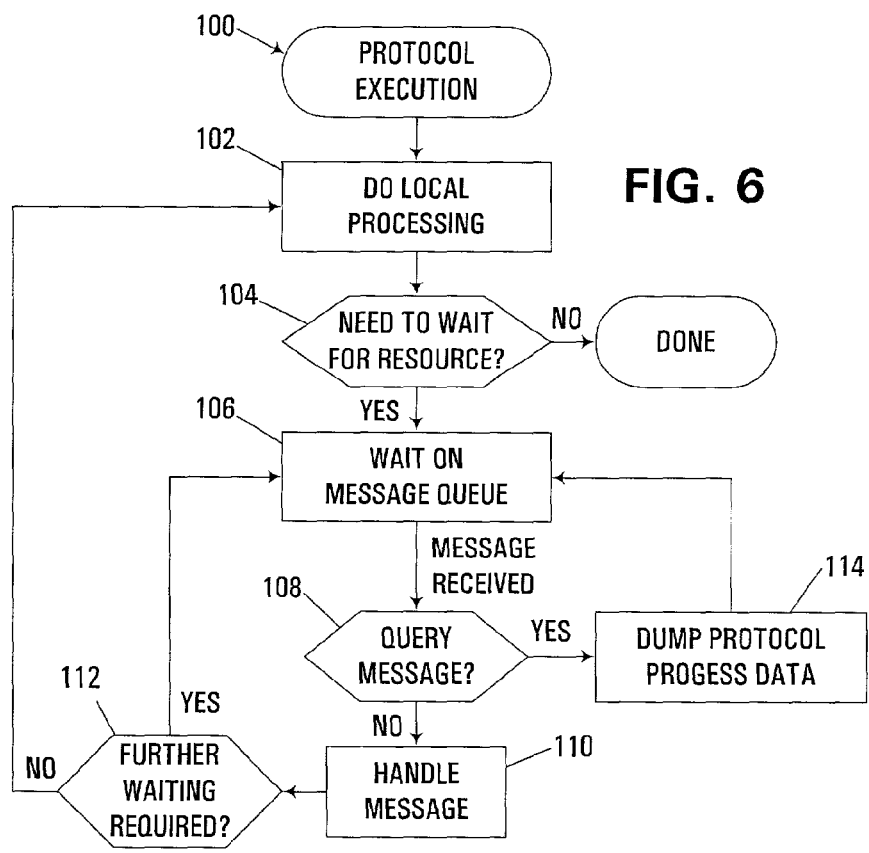
FIG. 6 is a flowchart illustrating the program flow of a protocol execution routine executed a node in the clustered computer system of FIG. 1, including support for responding to a status query consistent with the invention.

FIG. 6 next illustrates a representative protocol execution routine 100, which is called in response to a request from a member job to execute a local or distributed protocol. In response to a request to execute a protocol, routine 100 first passes control to block 102 to perform any initial local processing required of the protocol. Depending upon the type of protocol, various activities may be performed in the local member.

Once the local processing is complete, or has progressed to a point at which a resource must be waited upon, control passes to block 104 to determine whether there is a need to wait for a resource. If not, the protocol is capable of being completed without any waiting, so routine 100 terminates without delay. If, however, execution of the protocol requires waiting on a resource, block 104 passes control to block 106 to wait on the message queue.

As discussed above, a resource that a protocol may wait upon may be a local resource such as creation of a job or the acquisition of a lock, or may be an external resource such as the completion of an ACK round. Regardless, by waiting on the message queue in block 106, the member is permitted to receive other messages while the member is waiting upon the resource.

Whenever a message is received upon the message queue, control passes from block 106 to decode and process the message. For example, block 108 may detect whether the message is a query message. If not, control passes to block 110 to handle the message in an appropriate manner for the message. For example, receipt of an ACK message would result in calling of routine 80 of FIG. 5 from block 110.

Control then passes to block 112 to determine whether further waiting is required to complete the protocol. If not, control returns to block 102 to perform any additional local processing required to complete the protocol. Otherwise, block 112 passes control to block 106 to continue to wait on the message queue.

Returning to block 108, if the message is a "query" message, control passes to block 114 to dump the protocol progress data to the requesting user, typically including the current ACK round for the member and/or the information stored in the protocol progress table. Control then returns to block 106 to continue to wait on the message queue.

Therefore, it may be seen that, through the use of a structured ordered messaging system, coupled with localized tracking of protocol progress, status queries may be performed in a structured manner, and typically upon any randomly-selected member of a group, with a high probability of detecting a slow or stuck member. Particularly in the instance where a large number of group members exist, and/or where group members are widely dispersed over a wide area network, the ability to detect and diagnose clustering problems is significantly facilitated. Thus, despite the fact that an entire group of members may appear outside of a cluster to be stuck or slow, rather than having to randomly access the various members to detect a faulty member, typically any single member may be queried to obtain the relevant status information. Moreover, should any status query attempt fail, typically at most one additional member would need to be polled to obtain the relevant information.

As an example, returning to FIGS. 1 and 4, a request for the protocol status information via a query message sent to any of exemplary members J1-J7 would report that member J3 is behind the other members, by virtue of the lower (earlier) ACK round parameter for member J3 in table 64. It may therefore be determined rather easily that member J3 is the slow or stuck member. Even if the query is directed to member J3, and the member is waiting on a resource via the message queue, the requested information will still typically be returned. Further, even if the query is directed to member J3, but the member is hung outside of the message service, a second query directed to any other member would still return the requested information with relatively little additional effort.

Various modifications may be made to the illustrated embodiments consistent with the invention. For example, in some embodiments it may also be desirable to support membership changes to a group, whereby members may be added to a group during runtime. In such instances, it may be desirable to permit messages for a member to be preserved on a future list in such member until all other members reach a common ACK round. The preserved messages may then be played back for such member at that time.

Other modifications will be apparent to one of ordinary skill in the art. Therefore, the invention lies in the claims hereinafter appended.

What is claimed is:

1. A method of determining a status of a peer protocol initiated on a plurality of members of a group in a clustered computer system, the method comprising:

(a) locally tracking protocol progress information for a peer protocol within each of a plurality of members collectively managed as a group by a clustered computer system, wherein the peer protocol is of the type wherein each member of the group receives a message associated with the peer protocol and returns an acknowledgment in association with locally processing the peer protocol; and (b) responding to a query directed to a selected member of the group by providing the protocol progress information locally tracked by the selected member, wherein the query comprises a request for the protocol progress information.

2. The method of claim 1, wherein locally tracking protocol progress information includes tracking, within a first member of the group, acknowledgment (ACK) messages directed to the first member by each other member of the group.

3. The method of claim 1, wherein locally tracking protocol progress information includes:

(a) tracking, within a first member of the group, a current acknowledgment (ACK) round for the first member, the current ACK round associated with a current peer protocol being processed by the first member; and (b) tracking, within the first member, a last ACK round received parameter associated with each other member of the group, the last ACK round received parameter for each other member identifying a peer protocol associated with a last received ACK message from such other member.

4. The method of claim 3, wherein locally tracking protocol progress information further includes updating the current ACK round for the first member in response to receipt of ACK messages for the current peer protocol from all other members of the group.

5. The method of claim 1, wherein locally tracking protocol progress information includes updating the protocol progress information for a first member of the group in response to receipt of an acknowledgment (ACK) message directed to the first member.

6. The method of claim 1, further comprising:

(a) waiting on a resource required by a protocol being processed on the selected member; and (b) monitoring for receipt of the query by the selected member while waiting on the resource.

7. The method of claim 6, wherein the protocol is a peer protocol, and wherein waiting on the resource includes waiting for receipt of an acknowledgment (ACK) message directed to the selected member.

8. The method of claim 6, wherein the protocol is a local protocol, and wherein waiting on the resource includes waiting on a local resource requested by the selected member.

9. The method of claim 8, wherein the local resource is selected from the group consisting of a lock and a creation of a new job.

10. The method of claim 6, wherein waiting on the resource includes waiting for receipt of a message by a local message queue for the selected member, and wherein monitoring for receipt of the query includes monitoring the local message queue for receipt of a query message.

11. The method of claim 1, wherein locally tracking protocol progress information within each member of the group includes locally tracking within the selected member protocol progress information associated with at least one other member in the group.

12. The method of claim 1, wherein locally tracking protocol progress information within each member of the group includes locally tracking within the selected member protocol progress information associated with all other members in the group.

13. The method of claim 1, wherein locally tracking protocol progress information within each member of the group includes locally tracking within each member protocol progress information associated with each other member in the group.

14. An apparatus, comprising:

(a) a memory; and (b) a program resident in the memory, the program configured to determine a status of a peer protocol initiated on a plurality of members that are collectively managed as a group by a clustered computer system by locally tracking protocol progress information within at least one member of the group, and providing the protocol progress information locally tracked by a member of the group in response to a query directed to such member, wherein the peer protocol is of the type wherein each member of the group receives a message associated with the peer protocol and returns an acknowledgment in association with locally processing the peer protocol, and wherein the query comprises a request for the protocol progress information.

15. The apparatus of claim 14, wherein the program is configured to locally track protocol progress information by tracking, within a first member of the group, acknowledgment (ACK) messages directed to the first member by each other member of the group.

16. The apparatus of claim 14, wherein the program is configured to locally track protocol progress information by tracking, within a first member of the group, a current acknowledgment (ACK) round for the first member, and tracking, within the first member, a last ACK round received parameter associated with each other member of the group, wherein the current ACK round is associated with a current peer protocol being processed by the first member, and wherein the last ACK round received parameter for each other member identifies a peer protocol associated with a last received ACK message from such other member.

17. The apparatus of claim 14, wherein the program is further configured to wait on a resource required by a protocol being processed on the selected member, and monitor for receipt of the query by the selected member while waiting on the resource.

18. The apparatus of claim 17, wherein the protocol is a peer protocol, and wherein the program is configured to wait on the resource by waiting for receipt of an acknowledgment (ACK) message directed to the selected member.

19. The apparatus of claim 17, wherein the protocol is a local protocol, and wherein the program is configured to wait on the resource by waiting on a local resource requested by the selected member.

20. The apparatus of claim 17, wherein the program is configured to locally track protocol progress information by locally tracking within a first member protocol progress information associated with at least one other member in the group.

21. The apparatus of claim 17, wherein the program is configured to locally track protocol progress information by locally tracking within each member protocol progress information associated with each other member in the group.

22. A clustered computer system, comprising:
(a) a plurality of nodes coupled to one another over a network;
(b) a plurality of members collectively managed as a group by the clustered computer system and configured to be executed by at least one of the plurality of nodes; and
(c) a program configured to be executed by at least one of the plurality of nodes to determine a status of a peer protocol initiated on the plurality of members by locally tracking protocol progress information within at least one member of the group, and providing the protocol progress information locally tracked by a member of the group in response to a query directed to such member, wherein the peer protocol is of the type wherein each member of the group receives a message associated with the peer protocol and returns an acknowledgment in association with locally processing the peer protocol, and wherein the query comprises a request for the protocol progress information.

* * * * *